(12) United States Patent
Boys et al.

(10) Patent No.: US 9,283,858 B2
(45) Date of Patent: Mar. 15, 2016

(54) INDUCTIVE POWER TRANSFER APPARATUS

(75) Inventors: John Talbot Boys, Auckland (NZ); Chang-Yu Huang, Auckland (NZ)

(73) Assignee: Auckland Uniservices LTD, Auckland (NZ)

( * ) Notice: Subject to any disclaimer, the term of this patent is extended or adjusted under 35 U.S.C. 154(b) by 970 days.

(21) Appl. No.: 13/138,299

(22) PCT Filed: Feb. 5, 2010

(86) PCT No.: PCT/NZ2010/000017
§ 371 (c)(1),
(2), (4) Date: Oct. 17, 2011

(87) PCT Pub. No.: WO2010/090538
PCT Pub. Date: Aug. 12, 2010

(65) Prior Publication Data
US 2012/0025603 A1 Feb. 2, 2012

(30) Foreign Application Priority Data
Feb. 5, 2009 (NZ) ........................... 574677

(51) Int. Cl.
*H01F 27/42* (2006.01)
*B60L 11/18* (2006.01)
*H01F 38/14* (2006.01)
*H02J 5/00* (2006.01)
*H02J 7/02* (2006.01)

(52) U.S. Cl.
CPC .............. *B60L 11/182* (2013.01); *H01F 38/14* (2013.01); *H02J 5/005* (2013.01); *H02J 7/025* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ........ B60L 11/182; H01F 38/14; H02J 5/005; H02J 7/025; Y02T 90/122; Y02T 10/7088
USPC ........................................... 307/104
See application file for complete search history.

(56) References Cited

U.S. PATENT DOCUMENTS 4,873,677 A 10/1989 Sakamoto et al.
6,087,822 A * 7/2000 van der Veen ................ 323/356
(Continued)

FOREIGN PATENT DOCUMENTS

JP H0837121 2/1996
WO WO2005024865 3/2005
(Continued)

OTHER PUBLICATIONS

Machine translation of JP 08-37121 A; Matsushita Electric Works LTD; Feb. 6, 1996.*
(Continued)

*Primary Examiner* — Thienvu Tran
*Assistant Examiner* — Duc M Pham
(74) *Attorney, Agent, or Firm* — Law Office of Richard F. Jaworski PC

(57) ABSTRACT

A magnetic flux pad for generating or receiving magnetic flux has two pole areas (11, 12), a permeable core (14) and a coil (16) wound about the core. The pad allows useable flux to be generated at a significant height above a surface of the pad.

23 Claims, 14 Drawing Sheets

(56) References Cited

U.S. PATENT DOCUMENTS

| | | |
|---|---|---|
| 6,906,495 B2 | 6/2005 | Cheng et al. |
| 7,042,196 B2 * | 5/2006 | Ka-Lai et al. ............... 320/108 |
| 7,525,283 B2 | 4/2009 | Cheng et al. |
| 8,035,255 B2 | 10/2011 | Kurs et al. |
| 2009/0189565 A1 | 7/2009 | Cheng et al. |

FOREIGN PATENT DOCUMENTS

| | | |
|---|---|---|
| WO | WO2007126321 | 11/2007 |
| WO | WO2008051611 | 5/2008 |
| WO | WO2008140333 | 11/2008 |

OTHER PUBLICATIONS

New U.S. Patent Application entitled Inductive Power Transfer Apparatus filed concurrently herewith.

U.S. Patent Application entitled Inductive Power Transfer Apparatus filed Feb. 5, 2010, U.S. Appl. No. 13/138,298.

* cited by examiner

INDUCTIVE POWER TRANSFER APPARATUS

The present application is based on and claims the benefit of International Application Number PCT/NZ2010/000017 filed on Feb. 5, 2010, which claims priority from New Zealand Application 574677 filed Feb 5, 2009, and the entire contents of each of which are herein incorporated by reference.

FIELD OF THE INVENTION

This invention relates to apparatus for generating or receiving magnetic flux. The invention has particular, but not sole, application to a low profile, substantially flat device, such as a pad, for power transfer using an Inductive Power Transfer (IPT) system.

BACKGROUND

IPT systems, and use of a pad including one or more windings that may comprise the primary or secondary windings for inductive power transfer, are introduced in our published international patent application WO 2008/140333, the contents of which are incorporated herein by reference. One particular application of IPT power transfer pads is electric vehicle charging. IPT power transfer pads are used both in the vehicle as a power "pick-up" device (i.e. the secondary side winding of the IPT system), and at a stationary location such as a garage floor as the "charging pad" (i.e. the primary side winding) from which power is sourced.

In the development of pick-ups for inductively charging electric vehicles a problem of some concern is the clearance available under the vehicle. With conventional pick-up circuits power in sufficient quantities can be provided at distances up to perhaps 100 mm at which time the coupling factor becomes so small that it becomes impractical.

It is generally conceded that the power required to charge a typical electric vehicle overnight is about 2.0 kW, so that in an overnight charging mode some 24 kWH can be transferred. With modern electric vehicles this is enough energy to travel more than 100 km and is ideal for small vehicles used for tasks such as dropping children at schools, running errands, short commutes and the like.

Inductively coupled chargers commonly use two power pads that are circular in shape and may have dimensions of 400 mm diameter by 25 mm thick as shown in FIG. 1. However, to use an inductive charger such as this the vehicle must be positioned relatively accurately over the charging pad—typically within 50 mm of perfect alignment—and the separation between the power pad on the vehicle and the power pad on the ground must be closely controlled. In principle inductive power transfer may be accomplished for vertical spacings between 0 mm and 100 mm but if the system is set up for 100 mm it will have quite a large reduction in power at 120 mm and will be inoperable below 50 mm. This state of affairs occurs because both the self inductance and the mutual inductance of the power pads vary widely as the distance between the pads changes. The self inductance and the mutual inductance as a function of the separation for two identical circular pads that have the construction of FIG. 1, are shown in FIG. 2. Thus at 100 mm the power pad receiver or pick-up may have a pick-up voltage of 100 V and a short circuit current of 5.0 A for a power rating of 500 W. If the IPT system electronics operates with a Q factor of 4, then 2 kW can be transferred to the battery though there are still difficulties to overcome in producing the power needed at the appropriate battery voltage.

The induced voltage in the pick-up pad (i.e. the vehicle mounted power pad) is very separation sensitive—corresponding to the variation in mutual inductance shown in FIG. 2—so that at 120 mm it is reduced by approximately 40% while at 50 mm it is increased by a factor of 2. A reduction in power means that the vehicle does not get fully charged in the usual time, but the more challenging situation is that at smaller separations the power transferred may be so high that the components of the circuit are overloaded. Also, as the separation is reduced the self inductance of the pick-up coil also changes so that the circuit operates off-frequency putting extra stress on the power supply. As the separation gets smaller still this stress on the power supply caused by the non-tuned pick-up on the primary side cannot be sustained and the system must be shut down. In practice it is feasible to operate with a separation between 40 and 100 mm but a larger range is too difficult.

A range of separation from 40 to 100 mm is quite small. If the vehicle has a relatively high ground clearance then either the power pad on the vehicle has to be lowered or the power pad on the ground has to be raised. Automatic systems for doing this compromise the reliability of the charging system. Alternatively the pad on the ground can be on a fixed but a raised platform but such a pad is a tripping hazard when a car is not being charged and this situation is generally to be avoided in a garage or other location involving vehicles and pedestrians.

The known power pad construction of FIG. 1 comprises an aluminium case 1 containing typically eight ferrite bars 2 and a coil 3. Current in the coil causes magnetic flux in the ferrite bars and this flux has flux lines that start on the ferrite bars and propagate to the other end of the bar in a path containing the coil that may be thought of as a semi-elliptical shape. The flux lines 4 for a single bar are shown in FIG. 3. The flux lines leave the ferrite in an upward direction and propagate to the other end of the bar, entering it at right angles. No flux goes out the back of the pad as the solid aluminium backing plate 1 prevents it. In the actual pad the eight bars give a flux pattern shown approximately in cross section in FIG. 4. A simulation of the actual flux pattern is shown in FIG. 4A.

From FIG. 4A it can be seen that at the highest point the flux lines are essentially horizontal. Therefore, to get the maximum separation possible between the primary pad and the secondary pad it would be advantageous to detect this horizontal flux. However, the horizontal flux is still relatively close to the pad (extending from the pad approximately one quarter of the diameter of the pad) and there is no horizontal flux at all at the very centre of the power pad. Thus at the very point where maximum flux density would be ideal—the centre—the actual usable horizontal flux component is zero.

SUMMARY

It is an object of the invention to provide an improved apparatus or method for generating or receiving magnetic flux, or an improved IPT power transfer pad, or to at least provide a useful alternative.

Accordingly in one aspect the invention provides a magnetic flux pad having a front face and a back face for generating or receiving magnetic flux, the pad comprising:
 two pole areas for sending or receiving flux;
 a magnetically permeable core magnetically connecting the pole areas;
 a coil wound about the core; and whereby the flux enters the pad at one of the pole areas and exits the pad at the other pole area.

In some embodiments a flux shaping means is provided such that flux is directed into a space beyond the front face of the pad. The flux shaping means may be located adjacent to the back face of the pad and may advantageously comprise a member, such as a plate, constructed from a flux repelling material.

In some embodiments a flux shaping means is provided such that flux is substantially prevented from escaping from the core. The flux shaping means may comprise a flux repelling member located adjacent to the front face of the pad. It may further comprise a flux repelling member located adjacent to the rear face of the pad.

The coil may comprise a plurality of coils. The coils may be connected electrically in parallel and/or magnetically in series.

In another aspect the invention provides a magnetic flux pad having a front face and a back face for generating a magnetic flux in a space beyond the front face of the pad, the pad comprising:
two pole areas for sending or receiving flux;
a magnetically permeable core magnetically connecting the pole areas;
a coil wound about the core;
a flux repelling means provided adjacent to a rear face; and
whereby the flux enters the pad at one of the pole areas and exits the pad at the other pole area.

In a further aspect the invention provides an IPT power transfer pad including: a magnetic flux carrying member having a high magnetic permeability and two ends, each end being substantially adjacent a peripheral edge of the pad; and one or more windings provided about at least a part of the flux carrying member; and wherein said pad is configured such that magnetic flux exits or enters the flux carrying member substantially only at or adjacent to the ends.

In a still further aspect the invention provides an IPT system including a first magnetic flux pad or IPT power transfer pad for connection to a power supply and a second magnetic flux pad or IPT power transfer pad for connection to a load, the first and second magnetic flux pads or IPT power pads constructed according to any one of the above-described aspects and having one or more windings with the same number of turns, and wherein the number of turns is selected dependent on a required operating frequency In another aspect the invention provides an IPT system including a magnetic flux pad according to any one of the preceding statements.

In some embodiments the system supplies power to an electric vehicle, such as an electric vehicle charging system.

Further aspects of the invention will become apparent from the following description.

DRAWING DESCRIPTION

One or more embodiments are described below by way of example with reference to the accompanying drawings, in which.

DESCRIPTION OF ONE OR MORE EMBODIMENTS

A new concept in IPT power transfer arrangements is now disclosed. The embodiments described in this document relate to flux transmission and reception apparatus. These are commonly (although not necessarily) provided in the form of a discrete unit which may conveniently be referred to as power transfer pads i.e. arrangements that may be portable and which typically have a greater extent in two dimensions relative to a third dimension so that they may be used in applications such as electric vehicle charging where one pad is provided on a ground surface (such as a garage floor) and another in the vehicle. However, the disclosed subject matter may also be provided in other arrangements including permanent structures such as a roadway for example, and does not need to take the form of a pad.

Figure 5:
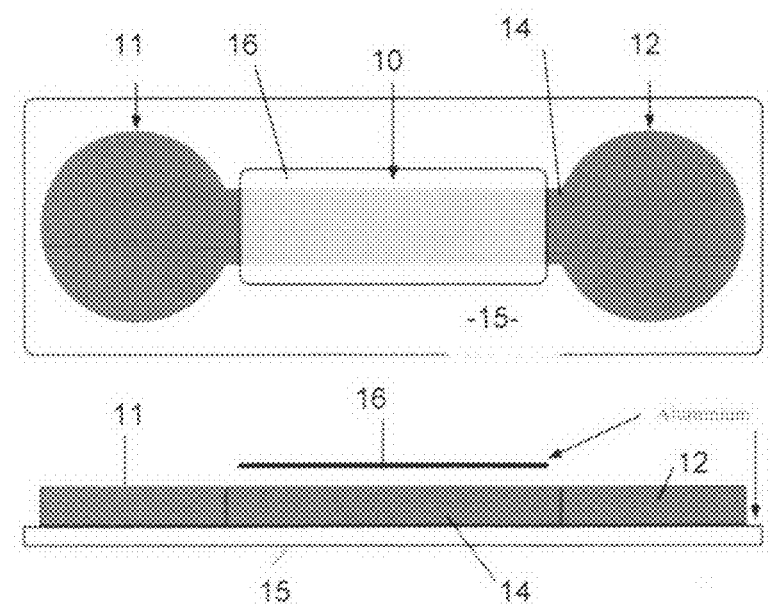
FIG. 5 is a plan view and elevation in cross section of an embodiment of a new IPT power transfer pad.

Referring to the arrangement of FIG. 5, a pad is shown which combines three leakage flux control techniques to produce a much enhanced performance. In this regard it uses a novel "flux pipe", generally referenced 10, to connect two separated pole area that provide flux transmitter/receiver portions that comprise pole areas 11 and 12. The flux pipe provides a generally elongate region of high permeance allowing a high flux concentration from which ideally no flux escapes. The flux pipe 10 has a core 14 of a material such as ferrite to attract flux to stay in the core. A back-plate 15 of aluminium is provided adjacent to a rear face of the pad and acts to 'frighten' or repel flux from leaking from the core 14. Above the core 14 there may be a separate aluminium plate 16 adjacent to a front face of the pad to complete the same 'frightening' or shaping task. Magnetic flux is attracted to the ferrite, and it is repulsed by the aluminium. With electric circuits there is a large difference between the conductivity of conductors, typically $5.6 \times 10^7$ for copper; and air—in the order of $10^{31\ 14}$—but this situation does not pertain with magnetic fields where the difference in permeability between ferrite and air is only the order of 10,000:1. Thus in magnetic circuits leakage flux in air is always present and this has to be controlled to get the best outcome.

The ends of the core 14 comprise the transmitter/receiver portions 11 and 12. The top plate 16 does not cover the end portions 11 and 12, so the flux is directed upwardly from the ends to provide flux in the space beyond the front face of the pad as will be seen further below.

Figure 6:
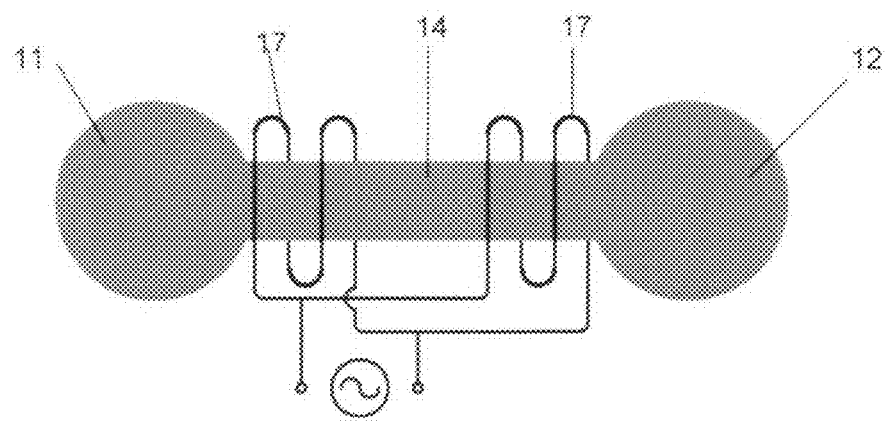
FIG. 6 is a diagrammatic view of the pad of FIG. 5 showing one example of a winding arrangement.

Plate 16 cannot be electrically connected to the backing plate 15 or the combination would constitute a short circuited turn. There is a winding on the flux core to electrically connect to the pick-up and the third flux control technique concerns this winding. It is well known that long toroidal windings have zero or very small leakage flux outside them. In the situation here a toroidal winding covering the full length of the flux pipe would have too much inductance but the winding can be partitioned into several windings 17 that are magnetically in series but electrically in parallel, as shown in FIG. 6. In practice two windings in magnetic series-electrical parallel placed with one at or toward each end of the flux pipe is a good approximation to a continuous winding and in some circumstances may outperform a single winding.

The provision of a winding arrangement that covers substantially the full length of the core 14 means that little flux escapes from the core. For example, in the embodiment having two windings connected electrically in parallel (magnetically in series), the flux linkages in each winding must be the same so essentially no flux can escape from the core. Thus, plate 16, in this embodiment, is not essential.

Figure 1:
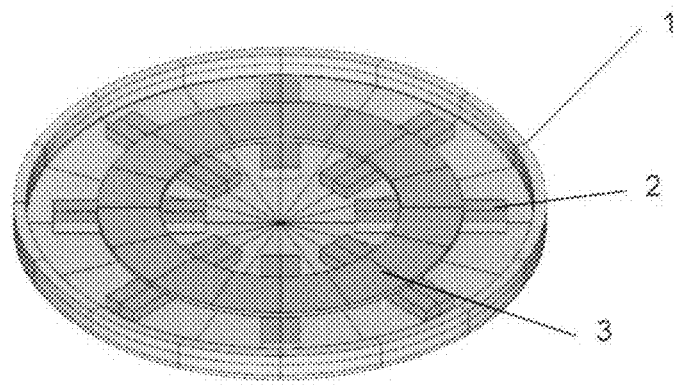
FIG. 1 is a perspective view of part of a known form of IPT power transfer pad.
Figure 2:
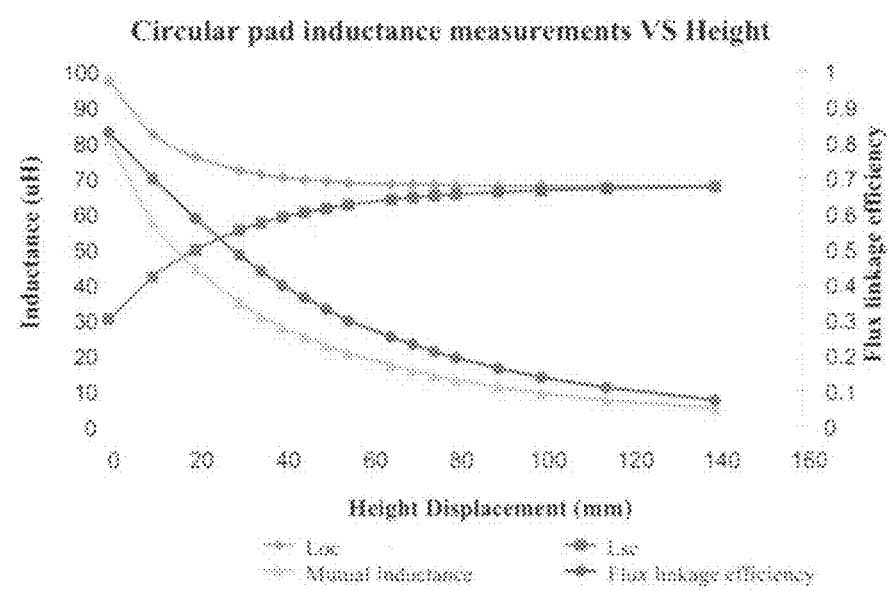
FIG. 2 is a graph of inductance measurements and flux linkage efficiency with respect to height displacement for a pad such as that of FIG. 1.
Figure 3:
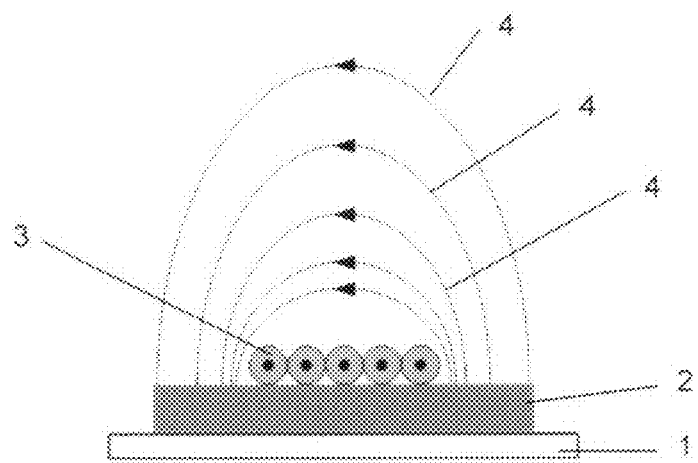
FIG. 3 is a diagrammatic elevation in cross section of a part of the pad of FIG. 1 showing flux lines.
Figure 4:
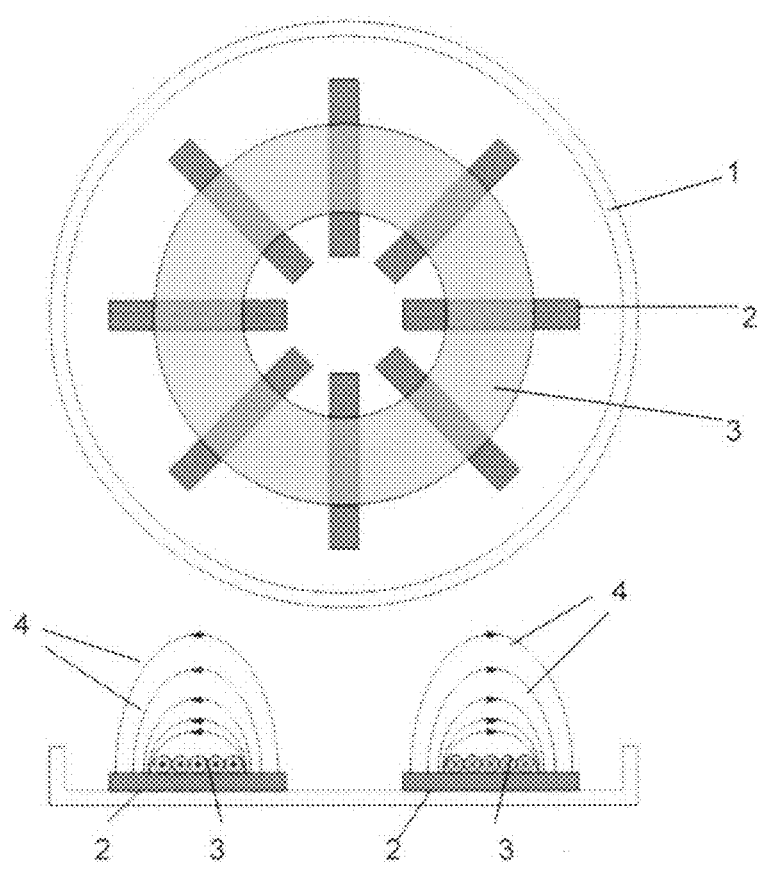
FIG. 4 is a plan view and elevation of a cross section of the pad of FIG. 1 showing flux lines.
Figure 4A:
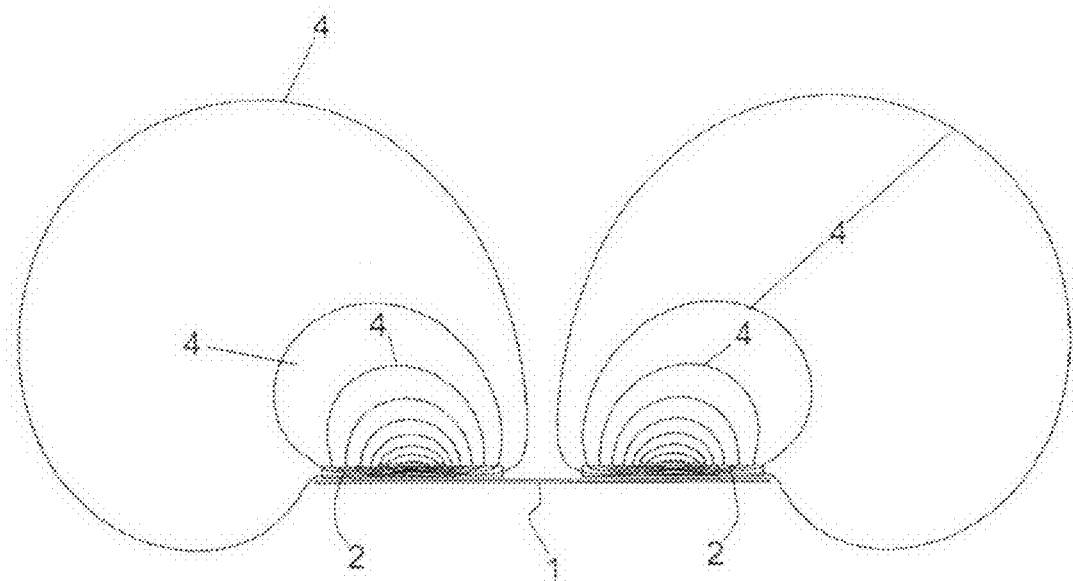
FIG. 4A is an elevation in cross section of a computer generated simulation of the magnetic field (indicated by flux lines) of the pad of FIG. 1.
Figure 7:
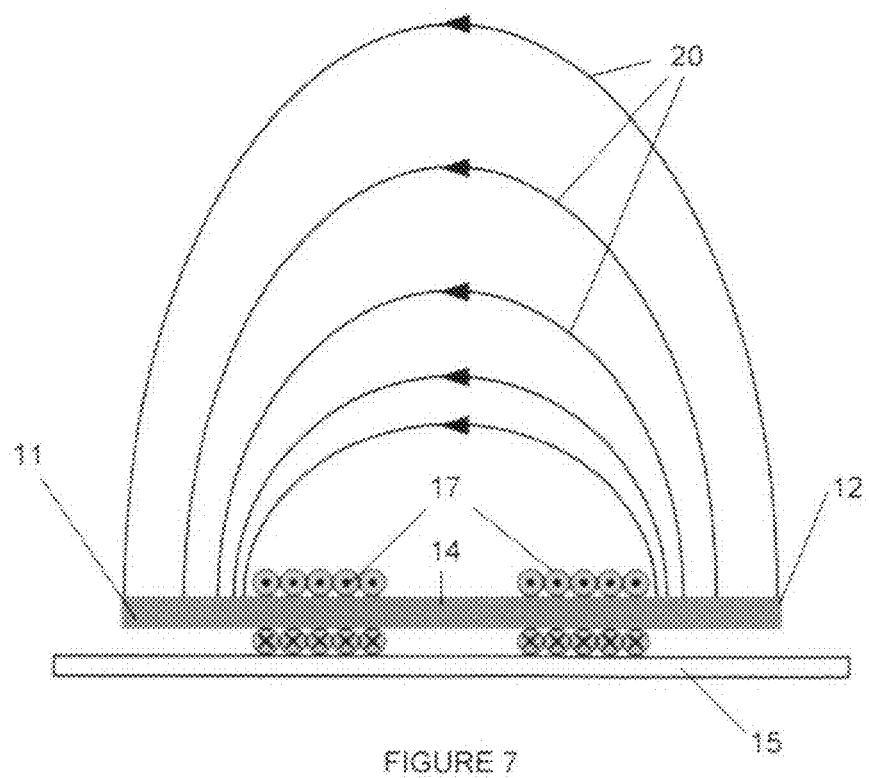
FIG. 7 is a diagrammatic elevation in cross section of the pad of FIG. 5, and showing flux lines.
Figure 7A:
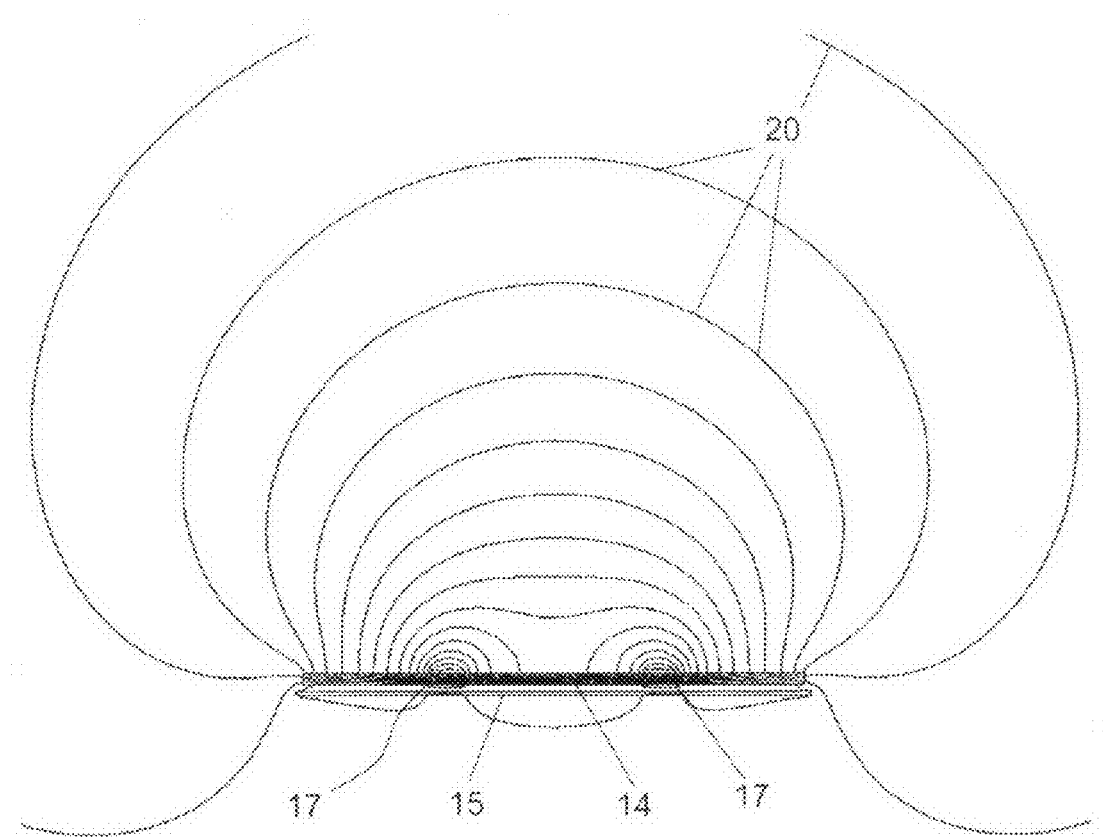
FIG. 7A is an elevation in cross section of a computer generated simulation of the magnetic field (indicated by flux lines) of the pad of FIG. 6.
Figure 8:
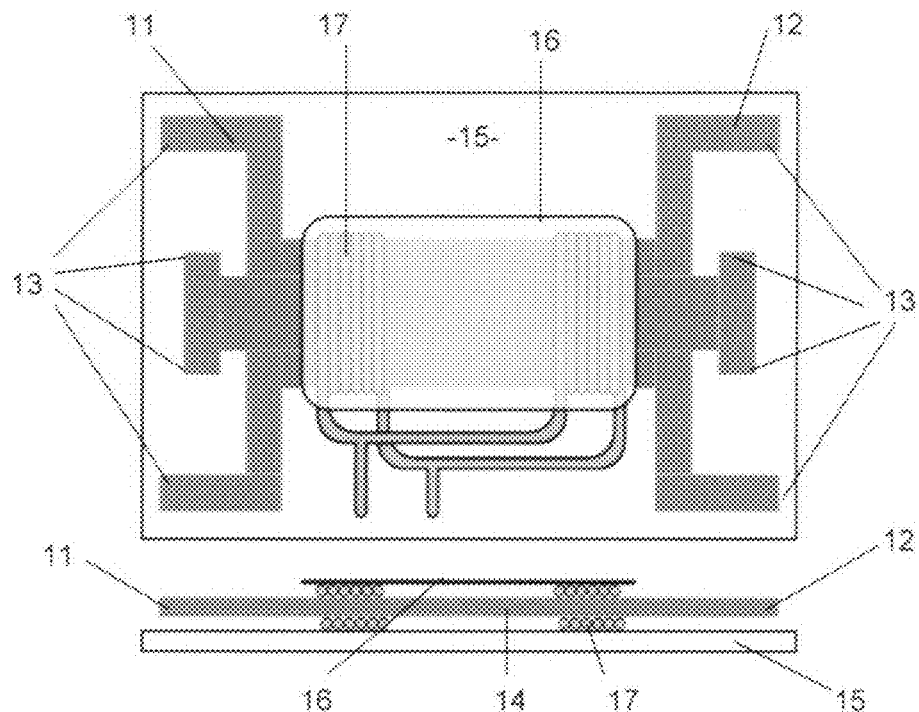
FIG. 8 is a plan view of another embodiment of a new pad based on the design of the pad of FIG. 5.
Figure 9:
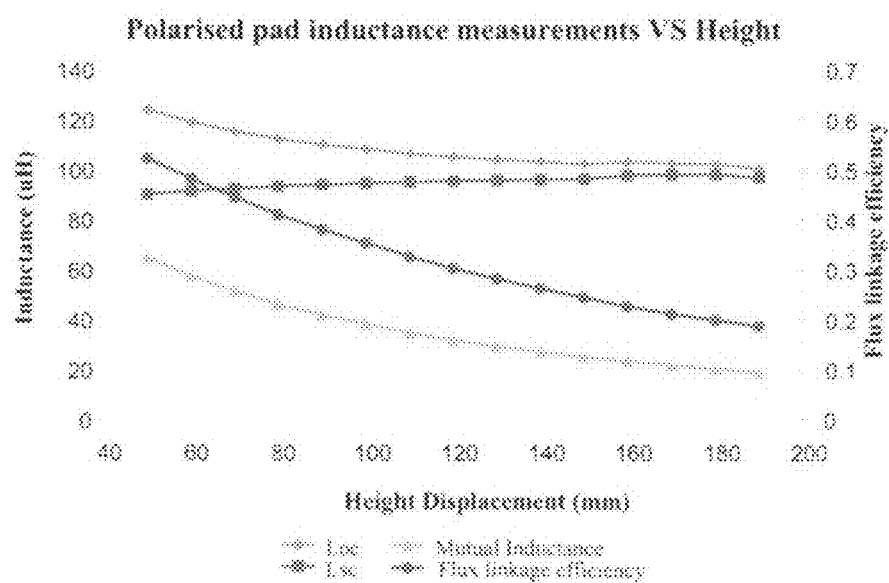
FIG. 9 is a graph of inductance measurements and flux linkage efficiency with respect to height displacement for a pad such as that of FIG. 7.
Figure 10:
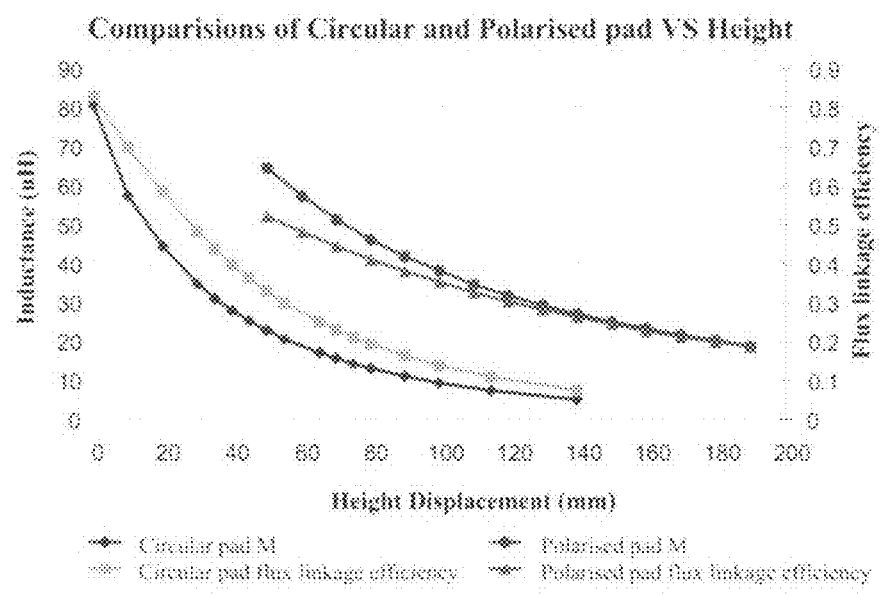
FIG. 10 is a graph of inductance measurements and flux linkage efficiency with respect to height displacement for both the pad of FIG. 1 (referred to as the Circular pad) and the pad of FIG. 7 (referred to as the Polarised pad)

The flux paths from a pick-up as in FIG. 5 are shown diagrammatically in FIG. 7 by flux lines 20. In FIG. 7A a computer generated simulation of the magnetic field (indicated by flux lines 20) of the pad of FIG. 6 is shown. As before they are approximately semi-elliptical but they are from a much larger base than the power pad ferrites of FIG. 1 and therefore can operate over much larger separations. At the centre of the pick-up the flux paths are horizontal as required. A practical pick-up is shown in FIG. 8, and measured self inductance and mutual inductance for this pick-up are illustrated in FIG. 9. A performance comparison of the circular pad of FIG. 1 and the new pick up of FIG. 8 is shown in FIG. 10. The pad design of FIGS. 5 and 8 is polarised so that the ends 11 and 12 must be aligned, but that is relatively easy to implement.

As shown in FIG. 8, some embodiments may include pole areas 11 and 12 that include finger portions 13. These allow the flux to be distributed more widely while using a minimal quantity of permeable material, thus lowering weight and cost.

A useful feature of the new pad design disclosed herein is that the winding number of the primary and secondary coils may in some embodiments be kept the same. This is quite different from the conventional IPT system setup, which normally has an elongated loop of one turn on the primary side and has a winding with multiple turns on the secondary side. This setup has two significant features, 1) the magnetic structure of both the primary and the secondary of the charger pads are the same, and 2) the induced voltage and uncompensated power at the secondary output (i.e. the pick-up pad) are independent of the operating frequency by varying the number of turns in relation to the frequency change.

The uncompensated power ($S_u$) and induced voltage ($V_{oc}$) of an IPT pick-up are commonly known and are expressed in equation 1 and 2, where $I_1$ is the primary track current, $L_1$ is the primary track inductance and $N_1$ and $N_2$ are the number of turns in the primary and secondary respectively. $N_1$ is equal to $N_2$ in this new pad design.

Under these conditions the rated uncompensated power for the pick-up $S_u$, the mutually coupled voltage $V_{oc}$ and the terminal voltage on the primary $V_1$ are given by $$S_u = \frac{\omega \cdot M^2 \cdot I_1^2}{L_2} \tag{1}$$

$$\propto \frac{f \cdot (N_1 N_2)^2 \cdot I_1^2}{N_2^2}$$

$$\propto f \cdot N^2 \cdot I_1^2$$

$$V_{oc} = j\omega \cdot N_1 N_2 \cdot I_1 \tag{2}$$

$$\propto f \cdot N^2 \cdot I_1$$

And $$V_1 = j\omega \cdot L_1 \cdot I_1 \tag{3}$$

$$\propto f \cdot N^2 \cdot I_1$$

Note that the short circuit current is proportional to M/L and is independent of the number of turns $$I_{SC} = I\frac{M}{L_2} = I \cdot k \tag{4}$$

where k is the magnetic coupling factor between the primary and the secondary. As mentioned earlier, the pick-up induced voltage and the uncompensated power are to be the same for a different operating frequency. This also means that the terminal voltage and the short circuit current are also equal. Equations 1 and 2 can be rewritten as shown in equations 5 and 6 respectively for the same uncompensated power and induced voltage but different operating frequency.

$$f_a N_a^2 I_a^2 = f_b N_b^2 I_b^2 \tag{5}$$

$$f_a N_a^2 I_a = f_b N_b^2 I_b \tag{6}$$

From equation 5:

$$N_b I_b = N_a I_a \sqrt{\frac{f_a}{f_b}} \tag{7}$$

Using equation 6 and 7:

$$\frac{N_b}{N_a} = \frac{f_a N_a I_a}{f_b N_b I_b} = \frac{f_a}{f_b}\sqrt{\frac{f_b}{f_a}} = \sqrt{\frac{f_a}{f_b}} \tag{8}$$

Using equation 3 and 6:

$$\frac{I_b}{I_a} = \sqrt{\frac{f_a N_a^2}{f_b N_b^2}} = \sqrt{\frac{f_a}{f_b} \cdot \frac{f_b}{f_a}} = 1 \tag{9}$$

Equation 5 to 9 indicate that the pick-up uncompensated power and $V_{oc}$ will be the same for different frequency while the primary current is kept the same and the winding turns are varied according to equation 8. For example, a charger pad with 15 turns on both primary and secondary, designed to operate at 38.4 kHz, would need to have the number of turns increased to 21 at 20 kHz in order to keep the pick-up $V_{oc}$ and uncompensated power the same. In other words, this feature enables charger pads with the same magnetic design to be used at a different frequency, and the pick-up output characteristic can be maintained the same simply by scaling the turns number accordingly. However, as shown in equation 10, the core flux is proportional to the number of turns and current, thus keeping the current constant and varying the number of turns will vary the core flux, and hence the flux density. By substituting equation 8 into equation 10, it can be shown that the flux in the core is varying proportional to $\sqrt{(f_a/f_b)}$, which is equivalent to equation 8. Thus, if the operating frequency is scaled down, the cross sectional area of the ferrite core may need to be increased to avoid ferrite saturation. An increase of cross sectional area is preferably done by increasing the thickness of the ferrite core so the magnetic reluctance path of the charger pad remains nearly identical.

$$\phi = \frac{L \cdot I}{N} \qquad (10)$$
$$= \frac{N^2 \cdot I}{N \cdot R_m}$$
$$\propto N \cdot I$$

where $R_m$ is the magnetic reluctance of the flux path.

The eddy current loss ($P_e$) and hysteresis loss ($P_h$) equations for the core are shown in equation 11 and 12 in units of W/m³. If the ferrite core cross sectional area are kept the same, the ratio of the eddy current loss and hysteresis loss for two different operating frequencies are given by equations 13 and 14.

$$P_e \propto B^2 f^2 \propto \frac{\phi^2 f^2}{A^2} \propto \frac{N^2 I^2 f^2}{A^2} \qquad (11)$$

$$P_h \propto f \cdot B^n \propto f \cdot \left(\frac{\phi}{A}\right)^n \propto f \cdot \left(\frac{N \cdot I}{A}\right)^n \qquad (12)$$

where n is the Steinmetz coefficient for the material and is normally in the range of 1.6-2.

$$\frac{P_{e,b}}{P_{e,a}} = \frac{N_b^2 I^2 f_b^2}{N_a^2 I^2 f_a^2} = \left(\frac{f_b f_b}{N_a f_a}\right)^2 \qquad (13)$$
$$= \left(\sqrt{\frac{f_a}{f_b}} \cdot \frac{f_b}{f_a}\right)^2 = \frac{f_b}{f_a}$$

$$\frac{P_{h,b}}{P_{h,a}} = \frac{f_b (N_b I_b)^2}{f_a (N_a I_a)^2} = \frac{f_b N_b^2}{f_a N_a^2} \qquad (14)$$
$$= 1$$

The above expressions suggest that for the same cross sectional area and volume, the hysteresis loss of the core will remain constant regardless of the frequency but the eddy current loss in the core will decrease proportionally to the decrease of operating frequency. As the overall power loss in a ferrite core is dominated by its hysteresis loss, most of the attributes, apart from the core flux density, of the charger pad will remain approximately the same with the operating frequency scaling process.

However, as discussed earlier the trade off of operating at a lower frequency is the increase of flux density in the core by $\sqrt{(f_a/f_b)}$. Thus to accommodate the higher flux density the ferrite cross sectional area should be increased in order to keep the flux density the same. With this increased volume of ferrite and keeping flux density constant, the power loss density in the ferrite core is expected to be lower as shown below. Equation 11 and 12 express the eddy current loss and hysteresis loss in terms of watt per m³, thus the total eddy current and hysteresis loss should take into account the ferrite volume (A*L) shown in equation 15 and 16 respectively.

$$\frac{P_{e,b}}{P_{e,a}} = \frac{\frac{\phi_b^2}{A_b^2} \cdot f_b^2 \cdot A_b \cdot L}{\frac{\phi_a^2}{A_a^2} \cdot f_a^2 \cdot A_a \cdot L} \qquad (15)$$
$$= \frac{N_b^2 I^2 f_b^2}{N_a^2 I^2 f_a^2} \cdot \frac{A_a}{A_b}$$
$$= \frac{f_b}{f_a} \cdot \frac{A_a}{A_b}$$

where L is the length of the charger pad ferrite core length and is kept constant.

$$\frac{P_{h,b}}{P_{h,a}} = \frac{f_b \cdot \left(\frac{\phi_b}{A_b}\right)^2}{f_a \cdot \left(\frac{\phi_a}{A_a}\right)^2} \cdot \frac{A_b \cdot L}{A_a \cdot L} \qquad (16)$$
$$= \frac{f_b \cdot \left(\frac{N_b I}{A_b}\right)^2}{f_a \cdot \left(\frac{N_a I}{A_a}\right)^2} \cdot \frac{A_b}{A_a}$$
$$= \frac{f_b}{f_a} \cdot \left(\frac{N_b}{N_a}\right)^2 \cdot \frac{A_a}{A_b} = \frac{A_a}{A_b}$$

Referring to the example discussed earlier where a charger pad operating frequency was scaled from 38.4 kHz to 20 kHz, the ferrite area will need to be increased by a factor of 1.385 $\sqrt{(38.4 \text{ kHz}/20 \text{ kHz})}$ in order to keep the flux density the same. Thus the eddy current and hysteresis loss of the charger pad, operating at 20 kHz, will be reduced by 37.59% and 72.17% respectively, compared with operating at 38.4 kHz at the same core flux density.

A Simulated Example

Figure 11:
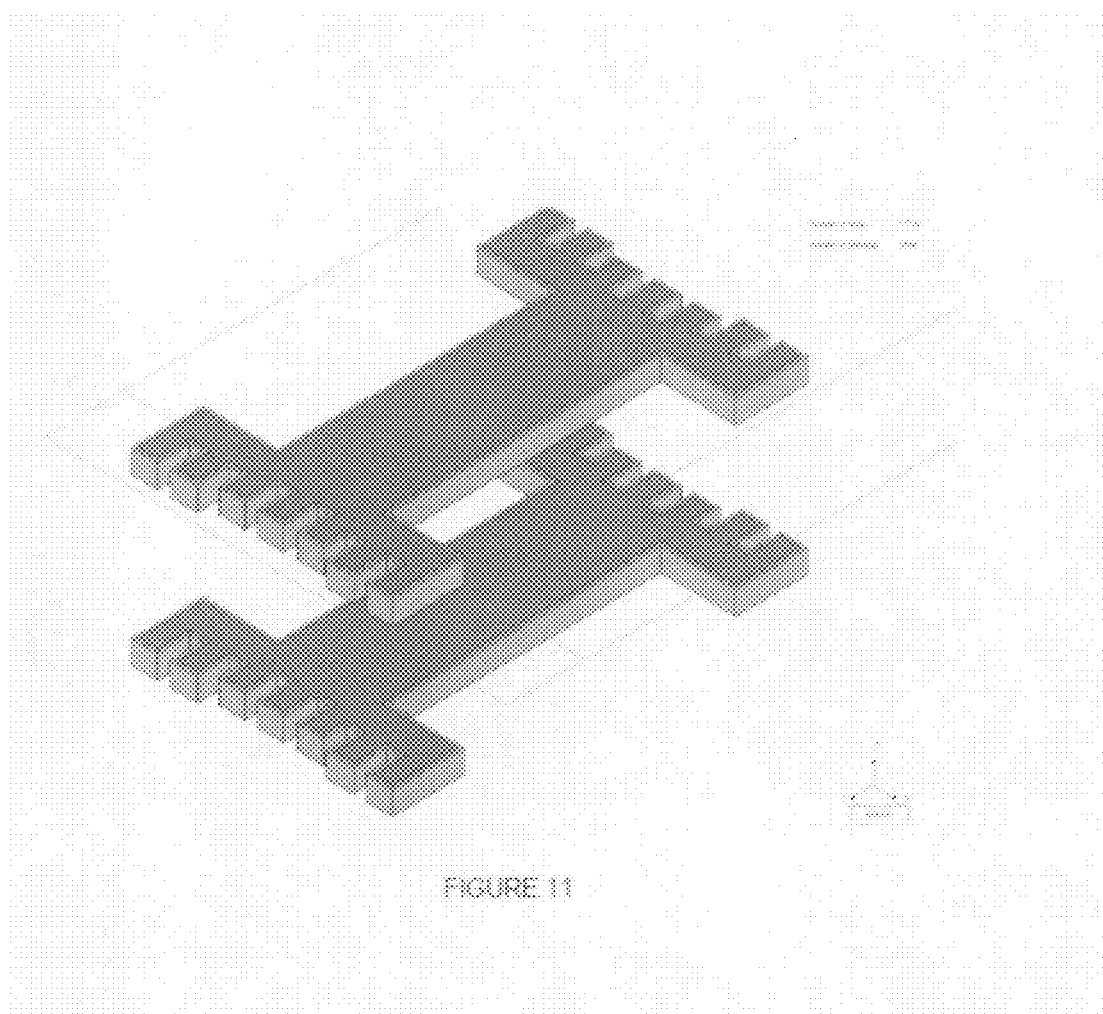
FIG. 11 is an isometric view of two separated ferrite cores showing an arrangement used for the purpose of simulating their performance in a power transfer system.
Figure 12:
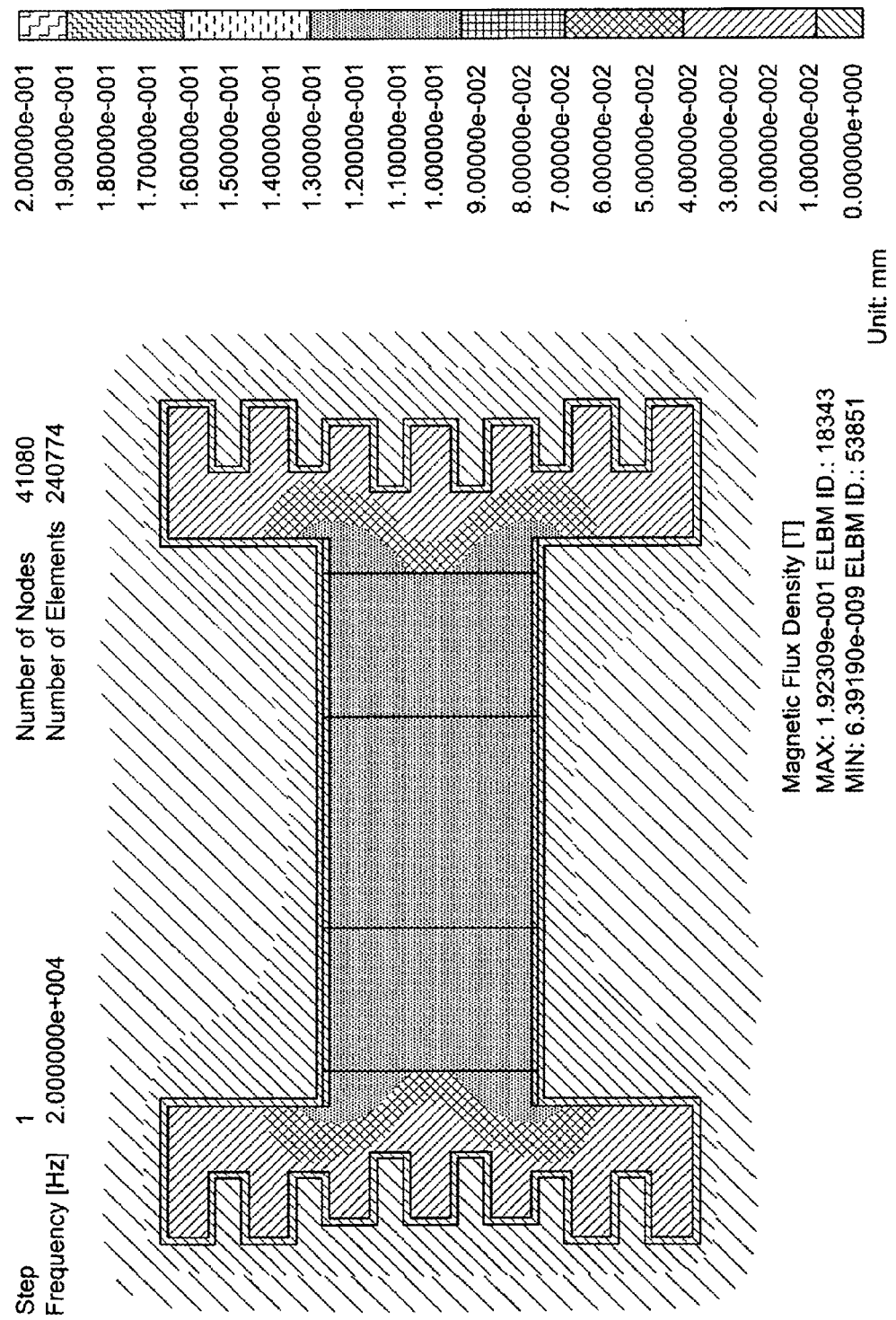
FIG. 12 is a computer generated flux plot in a pad as shown in FIG. 11 with 25 A current in windings provided about the ferrite core.
Figure 13:
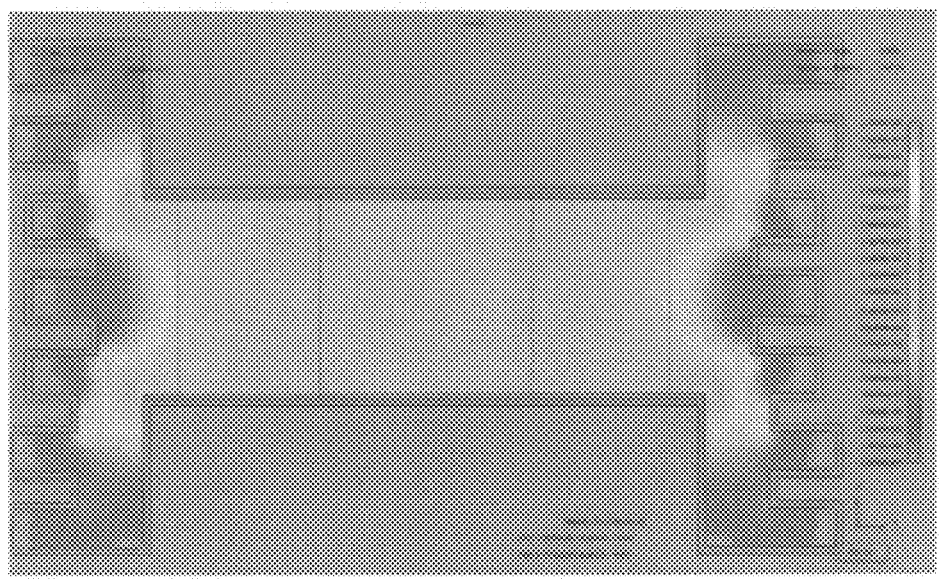
FIG. 13 is a computer generated plot showing flux density in the ferrite core of the pad referred to in FIG. 12 taken through an XY plane half way through the thickness (Z axis) of the ferrite core.

Referring now to FIGS. 11 to 17 a simulation of coupled power pads according to the invention will be described to provide an example of a possible embodiment and its use. In this example a coupled system of power pads is simulated with the pick-up winding open circuited. FIG. 11 shows the arrangement of the ferrite core which is essentially 93×28×16 mm blocks of ferrite ground to give very close fitting, and then glued together. The ferrite is surrounded by an aluminium wall with an 8 mm gap between the ferrite and the aluminium, and is 5 mm above an aluminium backing plate. A flux plot for the driven pad (i.e. the pad connected to a power supply) is shown in FIG. 12 for the situation where there are two coils driven magnetically in series, electrically in parallel with a current of 23 A. In these circumstances the flux density midway through the ferrite is shown in FIGS. 12 and 13. As shown the "flux pipe" is very effective in carrying the flux from one end of the pad to the other. Also, it can be seen from FIGS. 15 and 16 that there is essentially no leakage flux beyond the region between the pads.

Figure 14:
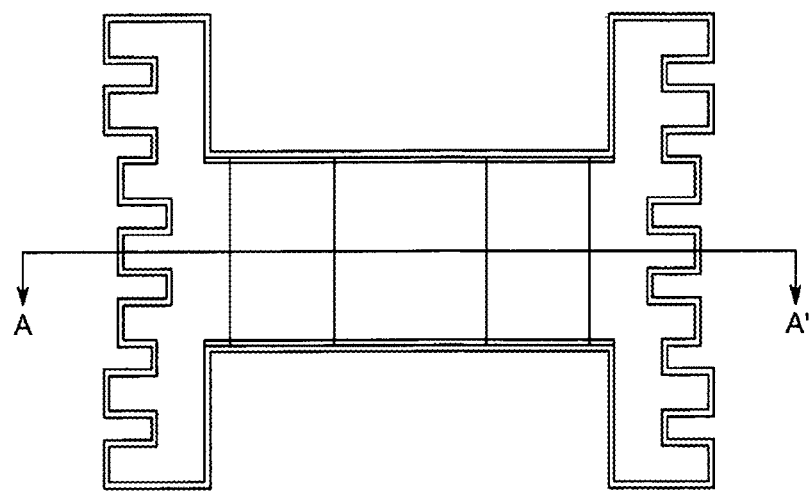
FIG. 14 is a plan view of the arrangement of FIG. 11 illustrating the position of a cut plane through the XZ axis at a point half way through the width (Y axis) of the ferrite cores of the assembly.
Figure 15:
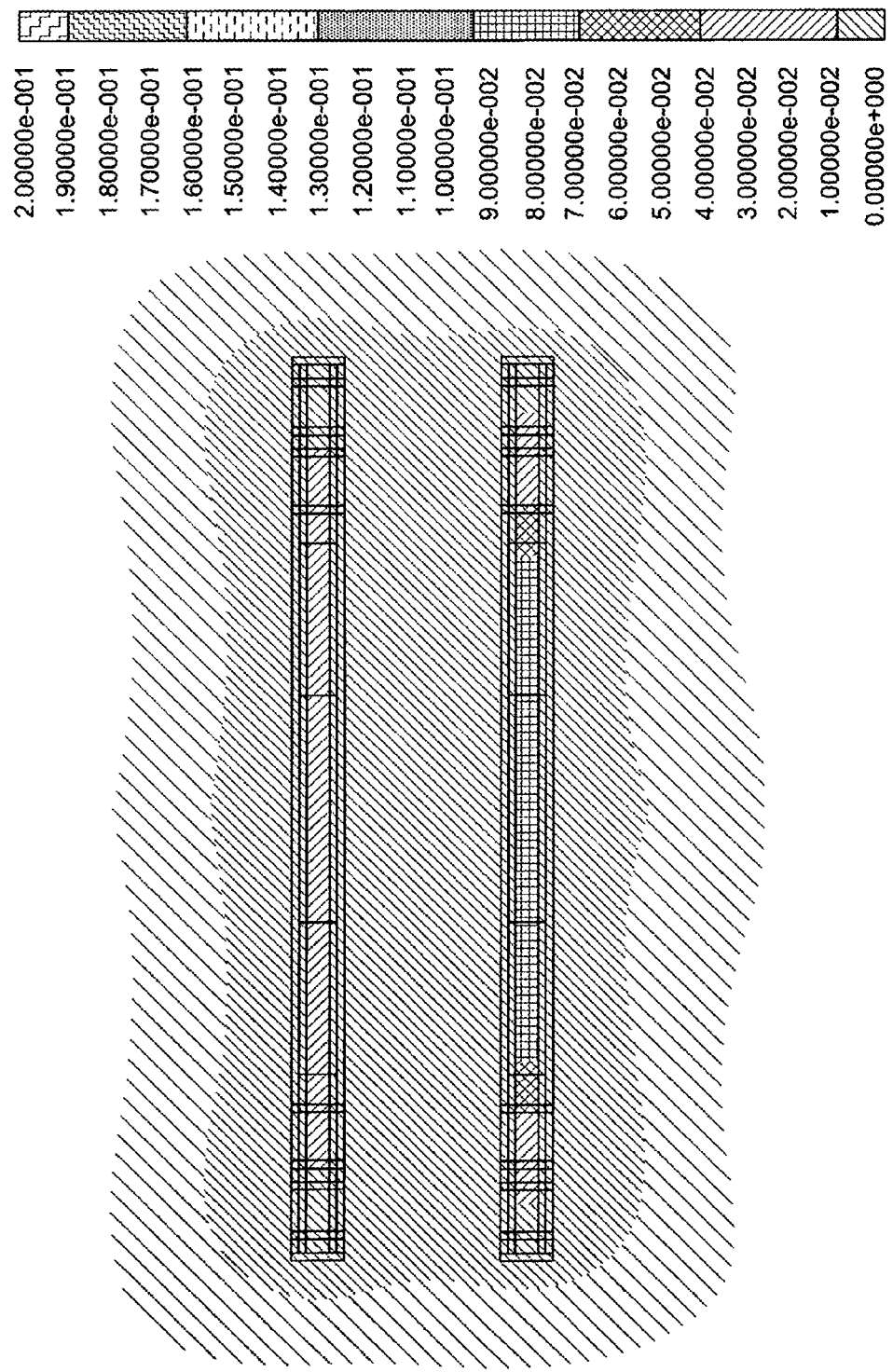
FIG. 15 is a computer generated flux plot on the cut plane of FIG. 14 for a 100 mm separation between the pads.
Figure 16:
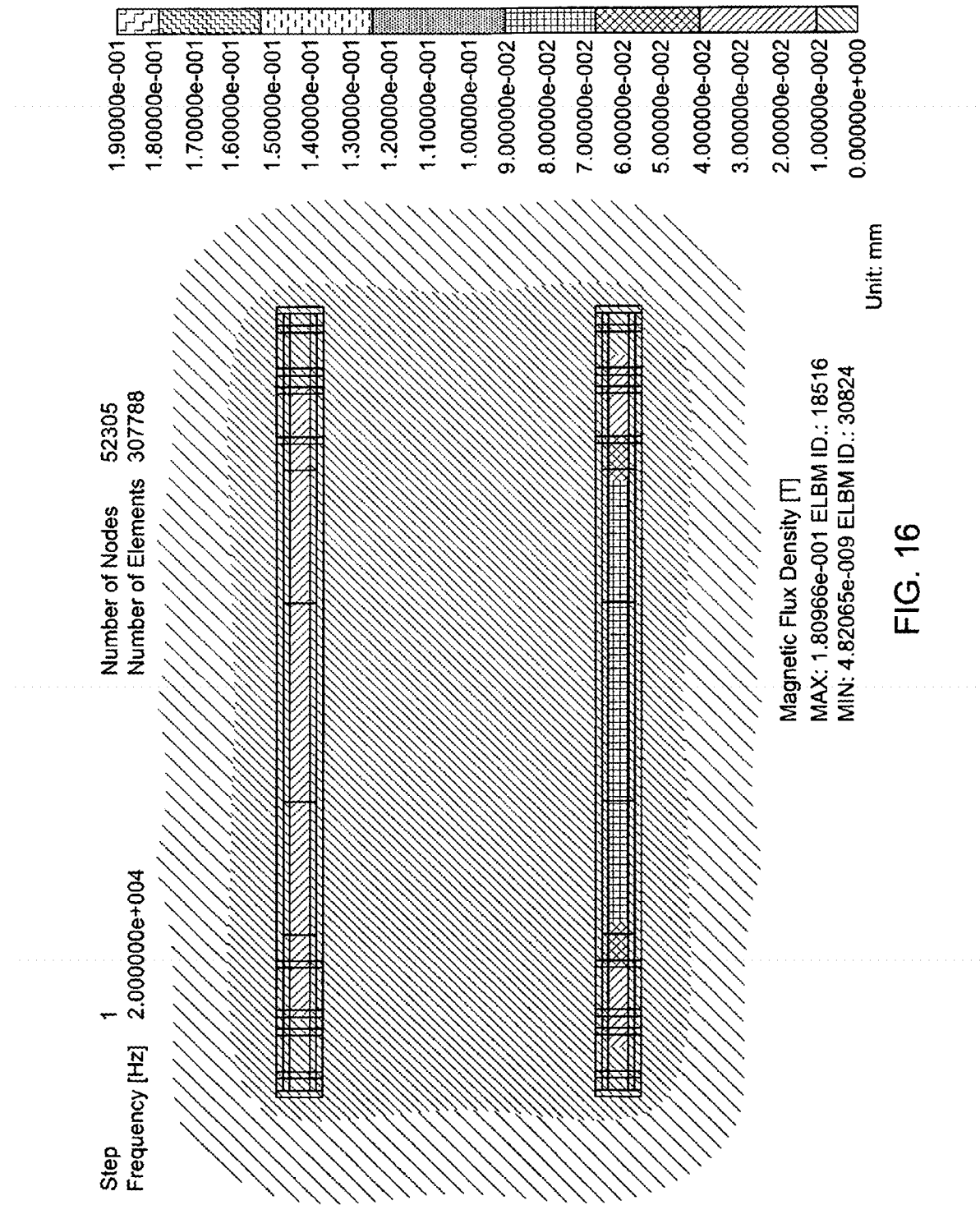
FIG. 16 is a computer generated flux plot on the cut plane of FIG. 14 for a 200 mm separation between the pads.
Figure 17:
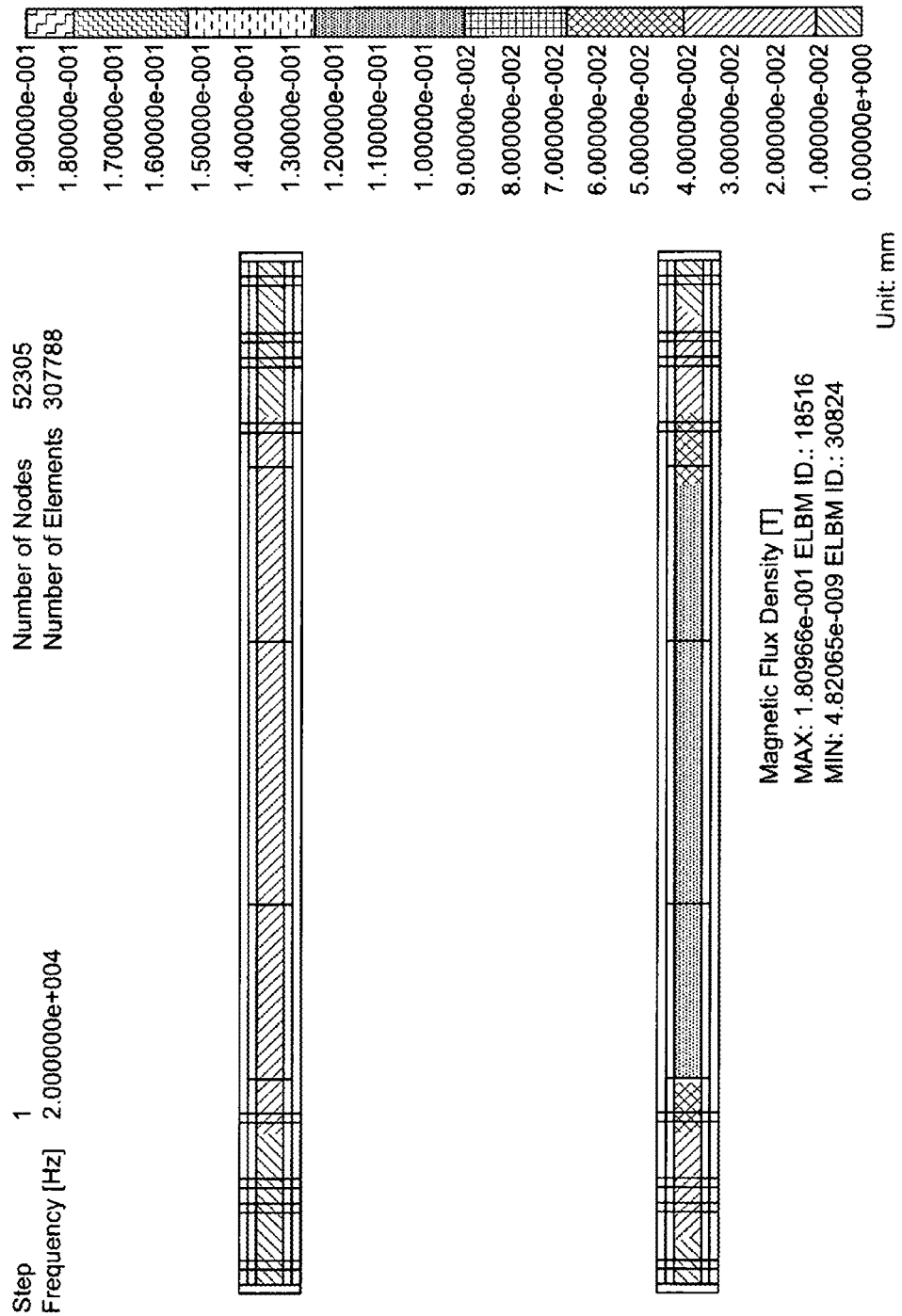
FIG. 17 is a computer generated plot showing flux density in the cut plane of FIG. 14 for a 200 mm separation between the pads.

For coupled pads a cut-plane is shown in FIG. 14 and the other Figures use measurements along this cut-plane to illustrate the performance of the system. The flux lines at 100 mm spacing between pads are given in FIG. 15 and for 200 mm spacing in FIG. 16. The flux density in the ferrites is shown in FIG. 18. The constant flux density in the ferrites of FIG. 18 shows that the flux pipe efficiently carries flux from one end of the pad to the other and thereby provides good magnetic coupling between the two pads. The maximum flux density in the driven pad (in the ferrite) is approximately 0.2 T which is safely below saturation for this ferrite. The flux density in the pick-up pad is lower but will increase substantially to about the same as the transmitter pad when the pick-up is resonated.

Therefore, the invention provides a low profile device, referred to herein as a pad, which can be used as a magnetic flux generator that can be used to generate useful flux a significant distance from the device. The device can also be used as a receiver of flux to thereby produce electric energy from the received field. The ability of the pad to generate or receive flux over a significant distance is particularly useful for charging or energising an electric vehicle.

Although certain examples and embodiments have been disclosed herein it will be understood that various modifications and additions that are within the scope and spirit of the invention will occur to those skilled in the art to which the invention relates. All such modifications and additions are intended to be included in the scope of the invention as if described specifically herein.

The word "comprise" and variations such as "comprising", unless the context clearly requires the contrary, is intended to be interpreted in an inclusive sense (i.e. as meaning "including, but not limited to").

The invention claimed is:

1. A magnetic flux pad for generating or receiving magnetic flux, the pad having a front face and a back face and comprising:
a magnetically permeable material having two ends from which magnetic flux is directed into an area beyond the front face of the pad;
two separated solenoidal windings connected magnetically in series and magnetically associated with the permeable material; and
a magnetic flux repelling member adjacent to the back face.

2. A magnetic flux pad as claimed in claim 1 wherein the magnetic flux repelling member directs magnetic flux into an area beyond the front face of the pad.

3. A magnetic flux pad as claimed in claim 1 further comprising a further flux repelling member located between the ends and on a side of the permeable material adjacent to the front face of the pad.

4. A magnetic flux pad as claimed in claim 1 wherein the windings are connected electrically in parallel.

5. A magnetic flux pad as claimed in claim 1 wherein each end comprises a plurality of fingers.

6. An IPT system including a magnetic flux pad or IPT power transfer pad according to claim 1.

7. An IPT system as claimed in claim 6 wherein the system supplies power to an electric vehicle.

8. A magnetic flux pad as claimed in claim 1 wherein the permeable material is elongate and each end of the core comprises a pole area.

9. A magnetic flux pad as claimed in claim 1 wherein each winding is provided adjacent to a pole area.

10. A magnetic flux pad as claimed in claim 1 wherein each winding provides substantially the same flux linkages.

11. A magnetic flux pad having a front face and a back face for generating a magnetic flux in a space beyond the front face of the pad, the pad comprising:
two pole areas for sending or receiving flux;
a magnetically permeable core magnetically connecting the pole areas;
a winding magnetically associated with the core;
a flux repelling member provided adjacent to a rear face; and
wherein each pole area includes a plurality of fingers.

12. An IPT system including a magnetic flux pad or IPT power transfer pad according to claim 11.

13. A magnetic flux pad as claimed in claim 11 wherein each winding provides substantially the same flux linkages.

14. A magnetic flux pad as claimed in claim 11 further comprising a further flux repelling member located adjacent to the front face of the pad.

15. A magnetic flux pad as claimed in claim 11 wherein the winding comprises two windings.

16. A magnetic flux pad as claimed in claim 15 wherein the windings are connected electrically in parallel.

17. A magnetic flux pad as claimed in claim 15 wherein the windings are connected magnetically in series.

18. A magnetic flux pad as claimed in claim 15 wherein the windings are separated.

19. A magnetic flux pad as claimed in claim 18 wherein each winding is provided adjacent to a pole area.

20. A magnetic flux pad as claimed in claim 15 wherein each winding provides substantially the same flux linkages.

21. A magnetic flux pad as claimed in claim 11 wherein the cores is elongate and the pole areas are at either end of the core.

22. An IPT system including a first magnetic flux pad or IPT power transfer pad for connection to a power supply and a second magnetic flux pad or IPT power transfer pad for connection to a load, the first and second magnetic flux pads or IPT power pads having one or more windings with a same number of turns, and wherein the number of turns is selected dependent on a required operating frequency.

23. An IPT system as claimed in claim 22 wherein the system supplies power to an electric vehicle.

* * * * *